United States Patent

[11] 3,622,958

[72] Inventors David Gordon Tucker
 Birmingham;
 Vernon Gearon Welsby, Solihull, both of
 England
[21] Appl. No. 828,532
[22] Filed May 28, 1969
[45] Patented Nov. 23, 1971
[73] Assignee National Research Development
 Corporation
 London, England
[32] Priority May 21, 1968
[33] Great Britain
[31] 26072/68

[54] ACOUSTIC DETECTION APPARATUS
 6 Claims, 2 Drawing Figs.
[52] U.S. Cl. .................................................... 340/1 R,
 181/0.5 NP, 340/3 R
[51] Int. Cl. ...................................................... G01s 9/66

[50] Field of Search ............................................ 340/3, 1, 16
 L, 3 D; 181/0.5 NP; 73/40.5 A

[56] References Cited
 UNITED STATES PATENTS
 3,302,161 1/1967 Ellison ........................ 340/3
 3,444,509 5/1969 Rubega et al. ................ 340/3
 2,961,869 11/1960 Bagno ........................ 340/3 D
Primary Examiner—Richard A. Farley
Attorney—Cushman, Darby & Cushman ABSTRACT: Accoustic detection apparatus for detecting the presence of gas bubbles in a liquid, for example, blood, comprises a transducer and a detector which is selectively tuned to detect a frequency other than that transmitted and which is generated in the medium due to the nonlinear effect of the bubbles. A single frequency may be transmitted and its second harmonic detected or else two frequency components transmitted and their sum or difference detected.

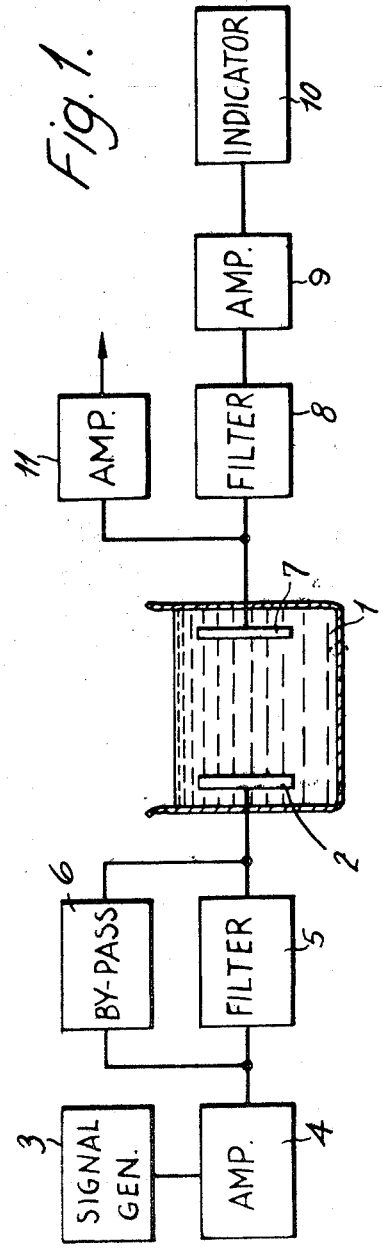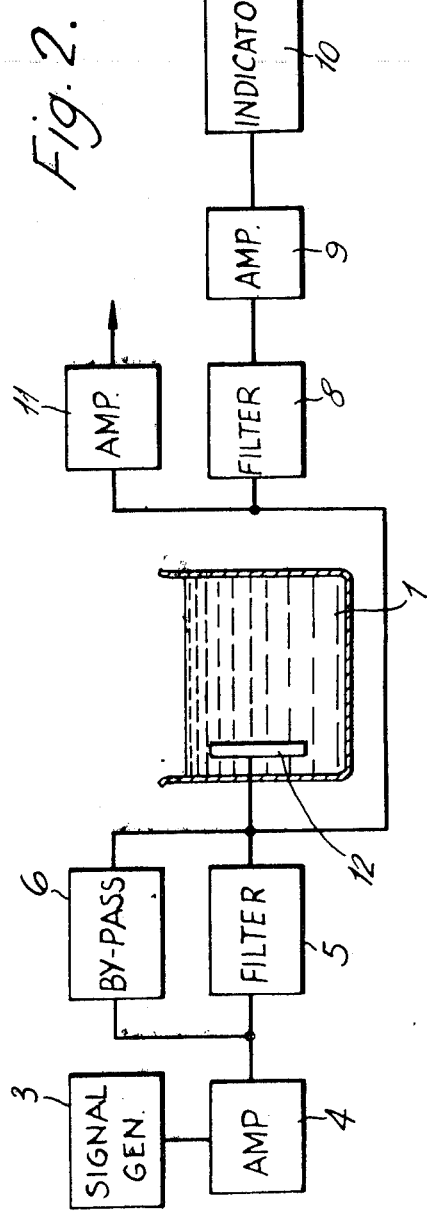

3,622,958

ACOUSTIC DETECTION APPARATUS

This invention relates to acoustic detection apparatus and is concerned with the detection of nonlinear properties in liquid media. The invention has particular application in the detection of bubbles of gas in liquids and may be used, for example, in the detection of gas bubbles in blood resulting from the decompression of divers.

Apparatus using acoustic waves for detecting the formation of gas bubbles in divers are known in which the reflection or attenuation of acoustic waves is measured.

It is an object of the present invention to provide apparatus using a more effective means of monitoring the formation of gas bubbles.

According to the present invention acoustic detection apparatus comprises a transducer arranged for coupling to a liquid medium and to transmit an acoustic wave therethrough at a predetermined frequency and acoustic detection means sensitive to acoustic waves of a related frequency generated in the medium due to nonlinearity thereof.

In one form of the invention the said transducer also acts as the acoustic detection means, but alternatively a separate receiving transducer may be provided to act as the acoustic detection means.

In one embodiment of the invention the detection means is tuned to the second harmonic of the transmitted frequency.

In an alternative arrangement an acoustic wave of two different frequency components is transmitted through the medium and the detection means is arranged to be sensitive to the sum or difference of the two components.

In order that the invention may be more fully understood reference will now be made to the accompanying drawing in which FIG. 1 and FIG. 2 illustrate diagrammatically two alternative embodiments thereof.

Referring now to FIG. 1, there is shown therein a container 1 for a liquid medium in which it is desired to detect the presence of gas bubbles. To this end an acoustic transducer 2 is positioned in the medium and is supplied from an electronic signal generator 3 coupled to a power amplifier 4 which in turn feeds a filter 5 arranged to have a narrow passband centered on the fundamental frequency generated by generator 3. This frequency may be a frequency in the ultrasonic range. A phase shifter and attenuator 6 is provided to bypass filter 5 and is adjusted in a manner to be described below.

Coupled to the liquid in container 1 there is also provided a receiving transducer 7 the output of which passes through a filter 8 tuned to reject the fundamental frequency of generator 3 and the output of which is passed through an amplifier 9 tuned to the second harmonic of that frequency and thence to an indicator 10. If desired the output from the receiving transducer 7 can also be applied to another amplifier 11 the output of which can be used to indicate the magnitude of the received fundamental frequency signal.

The apparatus is initially set up by providing a liquid in container 1 which is completely free from gas bubbles so that it has minimum nonlinear properties to acoustic waves. In order to compensate for any residual nonlinearity in the liquid and/or in transducers 2 and 7 phase shifter and attenuator 6 is adjusted to balance out any second harmonic components that are indicated in indicator 10. To measure the amount of gas bubbles in an unknown liquid the liquid is placed in container 1 and the effect of the gas bubbles will be to cause the medium in container 1 to have increased nonlinear properties and thus generate increased amounts of harmonics, particularly the second harmonic, of the fundamental frequency of the acoustic wave generated by transducer 2.

The additional nonlinearity will depend on the amount of the bubbles and hence the indicator 10 will show to what extent gas bubbles are present in the liquid.

In an alternative arrangement to that illustrated in FIG. 1, in which a separate transmit transducer and receive transducer are provided, it is possible to use a single transducer both for transmitting and receiving and such an arrangement is illustrated in FIG. 2 in which like parts have like reference numerals to FIG. 1 except that the transducer 12 illustrated therein acts both as the transmitting transducer and receiving transducer. With this arrangement it is possible to adjust the phase shifter and attenuator 6 with transducer 12 in air to compensate for the nonlinearity of transducer 12.

Instead of tuning amplifier 9 to the second harmonic, it is possible to utilize another harmonic or subharmonic of the input frequency if desired.

An important application of the apparatus illustrated in the above two FIGS. is for monitoring the gas bubbles in the blood of divers on decompression, to this end the two transducers of FIG. 1 or the single transducer of FIG. 2 may be applied directly to the surface of the skin of a diver to monitor the formation of gas bubbles in the blood or other tissue.

Although in the arrangements described above a single frequency is applied to the medium, the invention is in no way limited to the application of a single frequency and in an alternative arrangement two different frequency components are applied to transducers 2 or 7. In such a case the nonlinearity of medium 1 will cause the generation of sum and difference frequencies in the medium. In such a case filter 8 is tuned to reject both of the input frequencies and amplifier 9 is tuned to one or other of the sum or difference frequencies and filter 5 is tuned to reject that frequency.

We claim:

1. Apparatus for monitoring gas bubbles in the blood of a diver, said apparatus comprising:

a transducer adapted for application to the skin of a diver for transmitting an acoustic wave of at least one predetermined frequency into the blood if said diver, acoustic detection means also adapted for application to the skin of said diver for receiving the acoustic waves of a frequency harmonically related to said at least one predetermined frequency, which related frequency is generated in the blood due to the presence of gas bubbles therein, and filter means included in said detection means for blocking said at least one predetermined frequency thereby ensuring that the output of said detection means is a reliable indication of the presence of said gas bubbles.

2. Apparatus as claimed in claim 1 in which the said transducer also acts as the acoustic detection means.

3. Apparatus as claimed in claim 1 in which the acoustic detection means comprises a separate receiving transducer.

4. Apparatus for monitoring gas bubbles in a liquid, said apparatus comprising:

a transducer adapted for transmitting acoustic waves of at least one predetermined frequency into said liquid, acoustic detection means adapted for receiving acoustic waves of a frequency harmonically related to said at least one predetermined frequency, which related frequency is generated in said liquid due to the presence of gas bubbles therein, and filter means electrically connected to said acoustic detection means for blocking said at least one predetermined frequency thereby ensuring that the output of said filter means is a reliable indication of the presence of said gas bubbles.

5. Apparatus for monitoring gas bubbles in the blood of a diver, said apparatus comprising:

a transducer adapted for application to the skin of a diver for transmitting an acoustic wave of at least a single predetermined frequency into the blood of said diver, acoustic detection means also adapted for application to the skin of said diver for receiving the acoustic waves of the second harmonic of said single predetermined frequency which second harmonic is generated in the blood due to the presence of gas bubbles therein, and filter means included in said detection means for blocking said single predetermined frequency thereby insuring that the output of said detection means is a reliable indication of the presence of said gas bubbles.

6. Apparatus for monitoring gas bubbles in the blood of a diver, said apparatus comprising:

a transducer adapted for application to the skin of a diver for transmitting an acoustic wave of at least two predetermined frequencies into the blood of said diver, acoustic detection means also adapted for application to the skin of said diver for receiving the acoustic waves of intermodulation components of said at least two predetermined frequencies which intermodulation components are generated in the blood due to the presence of gas bubbles therein, and filter means included in said detection means for blocking said at least two predetermined frequencies thereby ensuring that the output of said detection means is a reliable indication of the presence of said gas bubbles.

* * * * *